US010199817B2

United States Patent
Hughes

(10) Patent No.: US 10,199,817 B2
(45) Date of Patent: Feb. 5, 2019

(54) VARIABLE DIAMETER CORE TERMINATION WITH VARIABLE DIAMETER HOUSING

(71) Applicant: COOPER TECHNOLOGIES COMPANY, Houston, TX (US)

(72) Inventor: David Charles Hughes, Rubicon, WI (US)

(73) Assignee: COOPER TECHNOLOGIES COMPANY, Houston, TX (US)

( * ) Notice: Subject to any disclaimer, the term of this patent is extended or adjusted under 35 U.S.C. 154(b) by 0 days.

(21) Appl. No.: 15/628,788

(22) Filed: Jun. 21, 2017

(65) Prior Publication Data

US 2017/0373484 A1    Dec. 28, 2017

Related U.S. Application Data

(60) Provisional application No. 62/354,167, filed on Jun. 24, 2016.

(51) Int. Cl.
| | | |
|---|---|---|
| *H02G 15/064* | (2006.01) | |
| *H02G 15/22* | (2006.01) | |
| *H02G 15/18* | (2006.01) | |

(52) U.S. Cl.
CPC ......... *H02G 15/064* (2013.01); *H02G 15/182* (2013.01); *H02G 15/22* (2013.01)

(58) Field of Classification Search
CPC ...... H02G 15/00; H02G 15/007; H02G 15/04; H02G 15/18; H02G 15/1806;
(Continued)

(56) References Cited

U.S. PATENT DOCUMENTS

| | | |
|---|---|---|
| D219,590 S | 12/1970 | Vose |
| D229,187 S | 11/1973 | Vrabel |
| | (Continued) | |

FOREIGN PATENT DOCUMENTS

| | | |
|---|---|---|
| WO | 1991000896 A1 | 1/1991 |
| WO | 1996010851 A1 | 4/1996 |
| WO | 2013096354 A1 | 6/2013 |

OTHER PUBLICATIONS

The International Search Report and Written Opinion From Corresponding International Patent Application No. PCT/US2017/038437, dated Oct. 19, 2017, 5 Sheets.
(Continued)

*Primary Examiner* — Chau N Nguyen
*Assistant Examiner* — Roshn K Varghese
(74) *Attorney, Agent, or Firm* — King & Spalding LLP

(57) ABSTRACT

A variable diameter termination includes an elastomeric tubular housing having a first portion with a first inner diameter, a second portion with a second inner diameter, and a third portion disposed between the first portion and the second portion and with a transition inner diameter. The elastomeric tubular housing is disposed on a tubular core that includes a first portion with a third outer diameter, a second portion with a fourth outer diameter, and a third portion disposed between the first portion and the second portion and with a transition outer diameter. The first portion of the elastomeric tubular housing is disposed over the first portion of the tubular core, the second portion of the elastomeric tubular housing is disposed over the second portion of the tubular core, and the third portion of the elastomeric tubular housing is disposed over the third portion of the tubular core.

13 Claims, 11 Drawing Sheets

(58) Field of Classification Search
CPC .... H02G 15/184; H02G 15/064; H02G 15/22; H02G 15/182; H02G 15/1833; H02G 15/1826; H02G 1/14; H01B 17/58; H01B 17/583; H01B 17/586
USPC .............................. 174/73.1, 74 A, 93, 136
See application file for complete search history.

(56) References Cited

U.S. PATENT DOCUMENTS

| | | | |
|---|---|---|---|
| 3,808,352 A | | 4/1974 | Johnson |
| 4,045,604 A | * | 8/1977 | Clabburn ................ B29C 63/42 174/179 |
| D247,963 S | | 5/1978 | Lewis |
| D261,756 S | | 11/1981 | Essig |
| 4,431,863 A | * | 2/1984 | Metzler, Jr. ............ H02G 15/18 174/136 |
| 5,280,136 A | * | 1/1994 | Yaworski ............. H02G 15/068 174/73.1 |
| 5,374,780 A | | 12/1994 | Pazdirek |
| 5,495,650 A | * | 3/1996 | Crepel ..................... H02G 1/14 29/235 |
| D375,079 S | | 10/1996 | Pazdirek |
| D392,616 S | | 3/1998 | Gagne |
| 5,844,170 A | | 12/1998 | Chor et al. |
| 5,877,453 A | * | 3/1999 | Hill ...................... H01B 17/325 174/179 |
| 6,031,186 A | | 2/2000 | Sakich et al. |
| 8,383,945 B2 | | 2/2013 | Defrance |
| 2007/0062718 A1 | | 3/2007 | Defrance |
| 2016/0300645 A1 | * | 10/2016 | Yaworski ............... H01B 17/58 |
| 2017/0306810 A1 | | 10/2017 | Nielsen et al. |
| 2017/0373484 A1 | | 12/2017 | Hughes |

OTHER PUBLICATIONS

Thomas&Betts Cable Accessories/Elastimold Catalog, "Elastimold Product Selection Guide®", Ranger2® Shrink-Fit Terminations 15-35kV, PG-CA-R2T-0909, © 2009,12 sheets.

Raychem Cable Termination Head, dated Jan. 18, 2016 (online), available from Internet at http://www.samm.com/en/product/1176/raychem-cable-termination-head-cold-applied-din-46235-6-10-15-kv.html, Year 2016, 2 pages.

Heat Shrinkable Cable End Termination, dated Mar. 1, 2017 (online), available from Internet at http://www.jointmask.com/heat-shrinkable-cable-end-termination, Year 2017, 1 page.

* cited by examiner

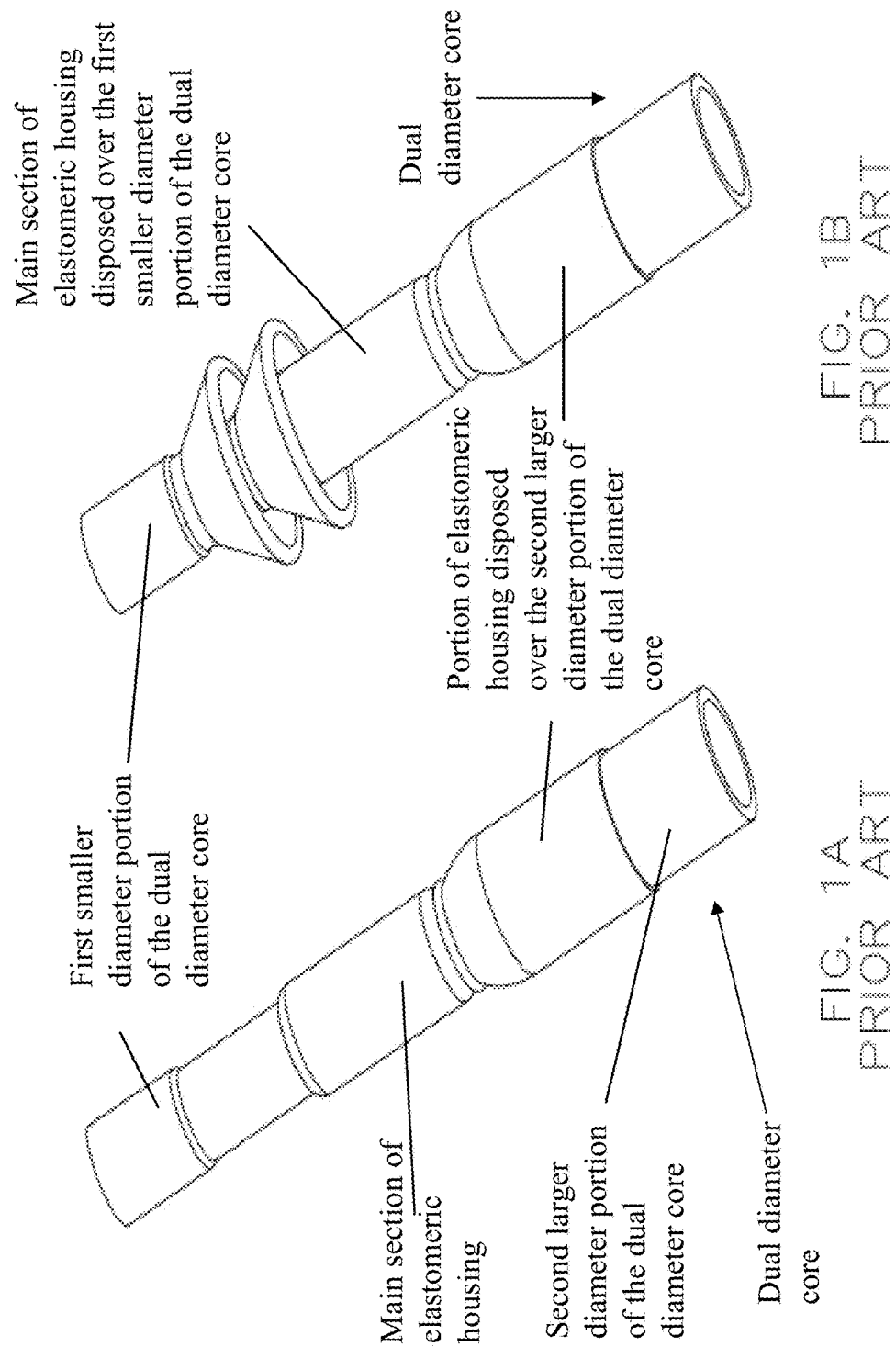

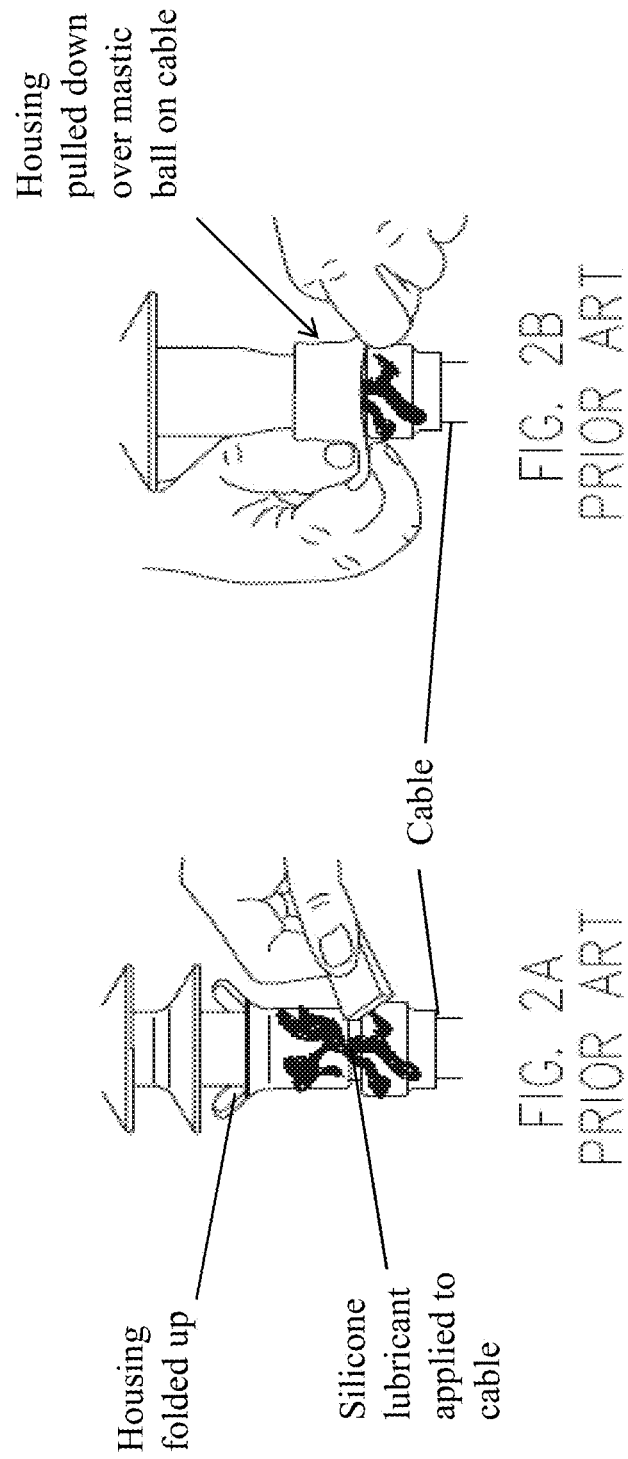

VARIABLE DIAMETER CORE TERMINATION WITH VARIABLE DIAMETER HOUSING

CROSS-REFERENCE TO RELATED APPLICATIONS

This application claims priority to U.S. Provisional Patent Application No. 62/354,167 filed Jun. 24, 2016 in the name of David Charles Hughes and entitled "Variable Diameter Core Termination with Variable Diameter Housing," the entire contents of which are hereby incorporated herein by reference.

TECHNICAL FIELD

Embodiments of the present disclosure relate generally to terminations or coverings for connections in cables, and more particularly to an improved termination having a variable diameter core with a variable diameter housing.

BACKGROUND

Underground cable terminations are primarily used in the power industry to transition from insulated underground cables to bare overhead conductors. Perhaps the most common type of termination is referred to as a cold shrink termination. A cold shrink termination typically consists of a molded elastomeric housing that is expanded and loaded onto a removable core. During field installation, the core and housing assembly is placed over a prepared cable and the core is removed, allowing the housing to shrink down to near its as-molded diameter creating an interference fit with the cable insulation.

One conventional termination includes a single, or constant, diameter elastomeric housing (one inside diameter throughout the length of the housing) that is loaded on or disposed over a dual diameter core as illustrated in FIGS. 1A and 1B. Loading the single, or constant, diameter elastomeric housing on the dual diameter core results in a portion of the elastomeric housing disposed over the larger diameter of the core being stretched far more than the portion of the elastomeric housing disposed over the smaller diameter of the core. As illustrated in FIGS. 1A and 1B, the single, or constant, diameter housing is shown bulging outward at one end indicating the stretching of the housing around the second larger diameter portion of the dual diameter core. Further, in said conventional termination, the portion of the housing disposed over the smaller diameter of the core is expanded significantly less than the elastomeric housing material's capability, thus restricting the ranges of cable that the termination can cover.

Another conventional termination illustrated in FIGS. 2A and 2B includes a single diameter core having a dual diameter housing (each part of the housing having a different inner diameter) that allows the termination to fit or cover a larger range of cables than compared to the termination with a dual diameter core and single diameter housing. To achieve the larger range of cables, the smaller inside diameter of the housing is expanded to near its maximum capability. Since the core is one straight diameter, this means that the larger inside diameter of the housing is not expanded very much, if at all. Since this portion of the housing is not significantly expanded, the housing (and the core beneath it) will not be able to slide over the larger diameter mastic and tape portion of the cable. As shown in FIG. 2A, the core must stop short and the larger diameter portion of the housing in this embodiment has to be folded back upon the smaller diameter housing portion. As a result, the installation of said conventional termination shown in FIG. 2B over a cable requires a user to perform numerous extra tedious steps. For example, as illustrated in FIG. 2B, the user will have to apply silicone lubricant to the cable and then pull down the folded up shed to tightly fit over the cable (or mastic ball around the cable). These additional steps may be time intensive, may increase the possibility of human error, and/or may be inconvenient to the user. Further, said additional step of pulling down the folded up shed over the lubricated cable may be tedious because the folded up shed may not be configured to provide a good grip to a user terminating the cable. This is further exacerbated by the silicone lubricant that may remain on the hands of the user from lubricating the cable.

The foregoing conventional cold shrink termination designs each have shortcomings. The examples in FIGS. 1A and 1B fully expand the elastomeric housing area that covers the larger mastic area of the cable to eliminate the extra installation steps, but sacrifices cable range taking ability because the main portion of the housing is not fully expanded. The prior art example in FIGS. 2A and 2B fully expands the main section of the housing that interfaces with the cable insulation to get optimal cable range taking ability, but does not fully expand the section of the housing that covers the cable mastic area, leading to a significantly more difficult and problematic field assembly.

Further, in conventional terminations, when the core and the housing assembly of the termination is placed over the prepared cable (e.g., cable with the mastic ball, the tape ball, etc., disposed over the outer diameter of the cable) for termination of the cable, the space/clearance between the outer diameter of the prepared cable and the inner diameter of the core of the termination may be limited. As a result, during field installation, when the core is removed to shrink or dispose the elastomeric housing over the prepared cable, portions of the core may engage the cable and get stuck requiring the termination to be cut and the termination process to be repeated with a new termination. This in turn results in a waste of the terminations and unnecessary delay which may be both time and cost intensive. Furthermore, the conventional terminations may not have good tracking resistance and dielectric breakdown resistance resulting in frequent deterioration requiring replacement of the conventional terminations. In other words, the conventional terminations may have a shorter life span and frequent replacements of the terminations may be cost, labor, and time intensive.

Accordingly, in light of the above mentioned shortcomings of the conventional terminations, there is a need for an improved termination.

SUMMARY

In one aspect, the present disclosure is related to a device for terminating a cable. The device includes an elastomeric tubular housing comprising a first portion having a first inner diameter, a second portion having a second inner diameter, and a third portion disposed between the first portion and the second portion and having a transition inner diameter that increases from the first inner diameter to the second inner diameter. Further, the device includes a tubular core configured to support the elastomeric tubular housing in a radially expanded state. The tubular core includes a first portion having a third outer diameter, a second portion having a fourth outer diameter, and a third portion disposed between the first portion and the second portion and having a transition outer diameter that increases from the third outer diameter to the fourth outer diameter. The first portion of the elastomeric tubular housing is disposed over the first portion of the tubular core, the second portion of the elastomeric tubular housing is disposed over the second portion of the tubular core, and the third portion of the elastomeric tubular housing is disposed over the third portion of the tubular core such that each of the first portion, the second portion, and the third portion of the elastomeric tubular housing is radially expanded to a substantially same extent.

In another aspect, the present disclosure is related to a method of manufacturing a termination device. The method includes providing a tooling that is configured to generate an elastomeric tubular housing for the termination device. Further, the method includes fabricating the elastomeric tubular housing using the tooling. The elastomeric tubular housing includes a body that has a first portion having a first inner diameter, a second portion having a second inner diameter, and a third portion disposed between the first portion and the second portion and having a transition inner diameter that increases from the first inner diameter to the second inner diameter. The body of the elastomeric tubular housing defines a cavity therethrough. Furthermore, the method includes expanding the elastomeric tubular housing from a relaxed state to receive a tubular core through the cavity of the elastomeric tubular housing. The tubular core includes a first portion having a third outer diameter, a second portion having a fourth outer diameter, and a third portion disposed between the first portion and the second portion and having a transition outer diameter that increases from the third outer diameter to the fourth outer diameter. Responsive to receiving the tubular core in the cavity of the elastomeric tubular housing that is expanded, the method includes releasing the elastomeric tubular housing such that the elastomeric tubular housing shrinks and is disposed on the tubular core. The elastomeric tubular housing is disposed on the tubular core such that the first portion of the elastomeric tubular housing is disposed over the first portion of the tubular core, the second portion of the elastomeric tubular housing is disposed over the second portion of the tubular core, and the third portion of the elastomeric tubular housing is disposed over the third portion of the tubular core. Further, each of the first portion, the second portion, and the third portion of the elastomeric tubular housing is radially expanded to a substantially same extent when it is disposed over the tubular core.

These and other aspects, objects, features, and embodiments, will be apparent from the following description and the appended claims.

BRIEF DESCRIPTION OF THE FIGURES

The foregoing and other features and aspects of the present disclosure are best understood with reference to the following description of certain example embodiments, when read in conjunction with the accompanying drawings, wherein:

FIGS. 1A and 1B illustrate terminations that have a dual diameter core with a single diameter housing, in accordance with the prior art;

FIGS. 2A and 2B illustrate another termination that has a single diameter core with a dual diameter housing and its installation over a cable, in accordance with the prior art;

Figure 3A:
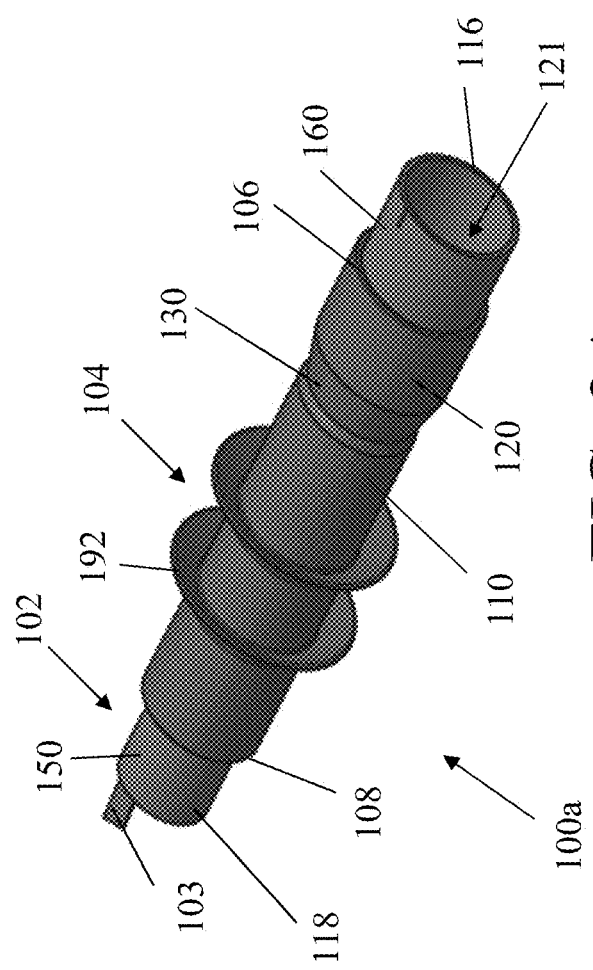
FIGS. 3A, 3B, and 3C (collectively 'FIG. 3') illustrate perspective views of different example variable diameter core terminations having variable diameter housings, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a variable diameter core termination that has a variable diameter elastomeric housing (herein 'variable diameter termination') disposed thereon. Preferably, the variable diameter termination may be configured for use with high and medium voltage power transmission and/or distribution conductors. However, one of ordinary skill in the art can understand and appreciate that the variable diameter termination may be used with conductors or cables in other appropriate example environments without departing from a broader scope of the present disclosure. In particular, the area of the variable diameter housing that is disposed over the portion of the variable diameter core that has a larger diameter starts with a larger as-molded inner diameter allowing the elastomeric housing to expand further to accept wider ranges of cables. That is, the variable diameter termination described herein has a capability to cover a larger range of cables as compared to conventional terminations while avoiding the above-described tedious installation steps (described in the Background section) of the conventional terminations. Unless otherwise specified herein, references to the diameter of the core are to the outer diameter of the core and references to the diameter of the housing are to the inner diameter of the housing because those diameters are most relevant to the fit of the housing on the core.

The variable diameter termination of the present disclosure may include a plurality of sheds that are formed on the variable diameter housing for providing additional insulation. It is noted that the sheds may be flexible. In particular, the sheds extend radially outward from and substantially perpendicular to the outer diameter of the variable diameter housing, and the number of sheds that are formed on the variable diameter housing may vary based on the electrical power transmission capacity of the cable that is to be terminated by the variable diameter termination. Some example variable diameter terminations may have four or more sheds formed on the variable diameter housing, while other variable diameter terminations may have three sheds formed on the variable diameter housing. The distance between the sheds and the diameter of the sheds formed on the variable diameter housing described in the present disclosure may be larger than that of the housings in the conventional terminations. The larger distance between the sheds and the larger diameter of the sheds result in improved tracking resistance and impulse withstand capability (e.g., capability to withstand transient overvoltage conditions) using fewer sheds as compared to conventional terminations. Accordingly, the variable diameter terminations of the present disclosure have increased and improved longevity compared to conventional terminations.

The sheds may be arranged as different sets, where the distance between different sets of sheds may be larger than the distance between the different sheds of each set. For example, in a variable diameter termination having four sheds, the first three sheds may be formed as one set and the fourth shed may be formed as another set. In said example, the distance between the fourth shed and the shed of the first set that is closest to the fourth shed (herein 'third shed') may be larger than the distance between each of the three sheds of the first set. The larger distance between the adjacent sheds of the two adjacent sets of sheds, or particularly, the third shed and the fourth shed of said example enables different variable diameter termination models to be manufactured using the same tooling. In particular, the larger distance between the adjacent sheds of the two adjacent sets of sheds allows a block to be placed in or removed from the tooling to manufacture a shorter variable diameter termination model having only one set of sheds or a longer variable diameter termination model having more than one set of sheds using the same tooling. That is, in said above-mentioned example, the same tooling can be used to manufacture a shorter variable diameter termination model having three sheds and a longer variable diameter termination having four or more sheds. In the present disclosure, a block can be a simple structure that covers one or more recesses that form one or more sheds or the block can be a more complex structure.

Additionally, the variable diameter termination of the present disclosure may include optional pull tabs with finger-grip through-holes to provide additional grip to fold the pull tabs as needed.

Example embodiments of the variable diameter terminations and an example method of manufacturing the variable diameter terminations will be described more fully hereinafter with reference to the accompanying drawings that describe representative embodiments of the present technology. The technology may, however, be embodied in many different forms and should not be construed as limited to the embodiments set forth herein; rather, these embodiments are provided so that this disclosure will be thorough and complete, and will fully convey the scope of the technology to those appropriately skilled in the art.

Turning now to the figures, example embodiments of a variable diameter termination will be described in connection with FIGS. 3-6. An example method for manufacturing a variable diameter termination will be described by in connection with FIGS. 7-8, making additional reference to FIGS. 3-6, as needed.

Variable Diameter Termination

Figure 3B:
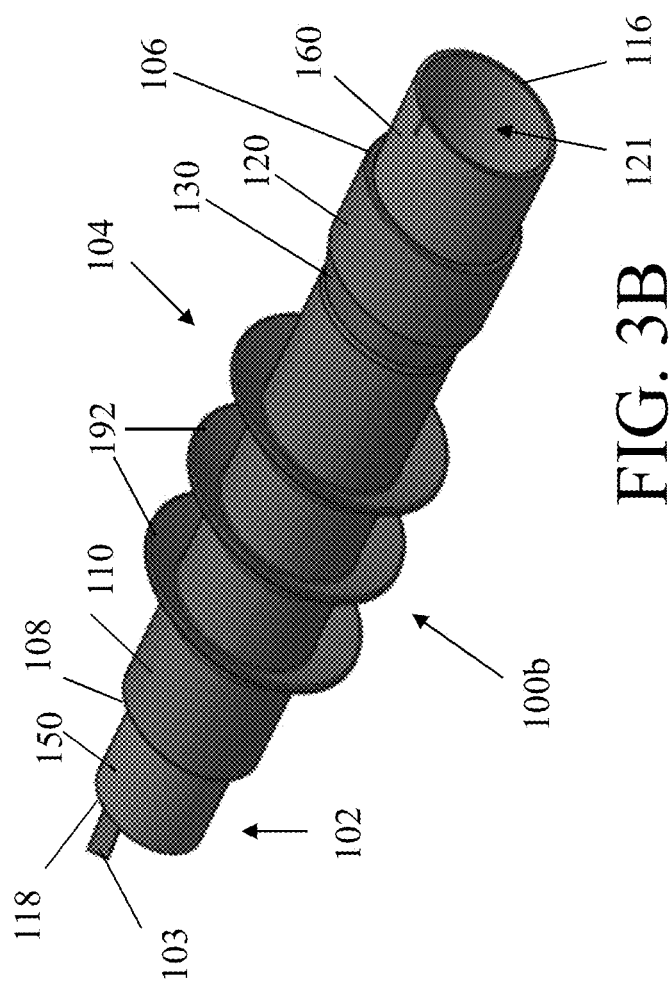
Figure 3C:
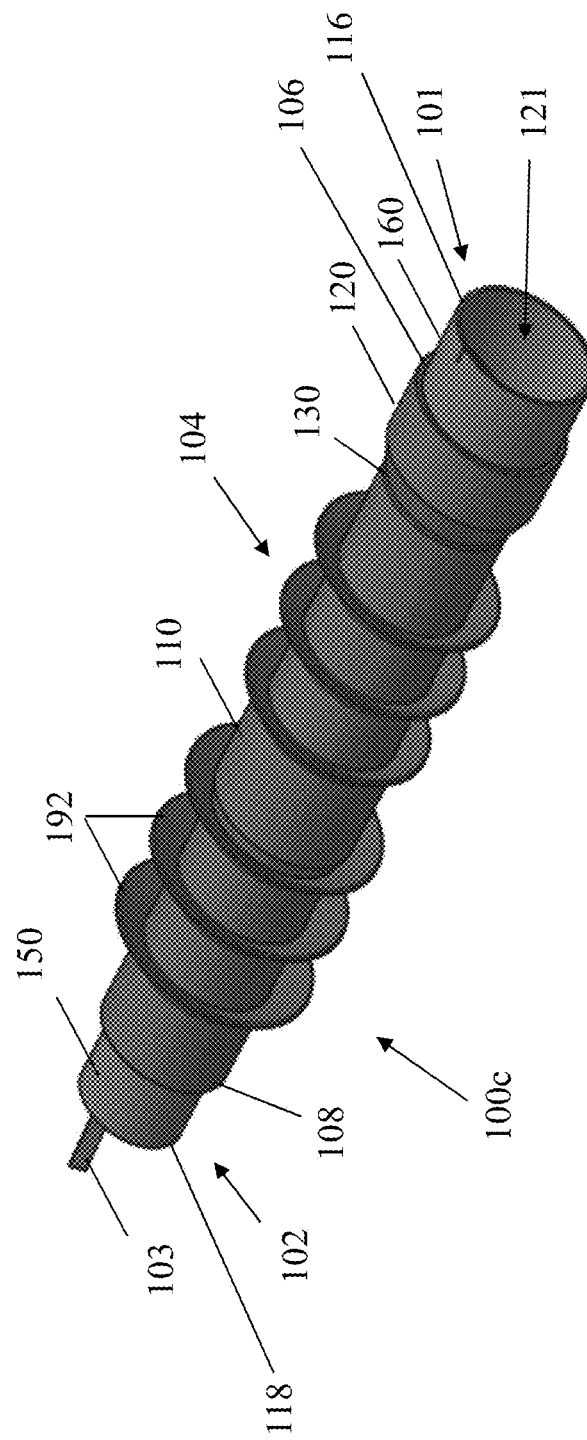
Figure 4A:
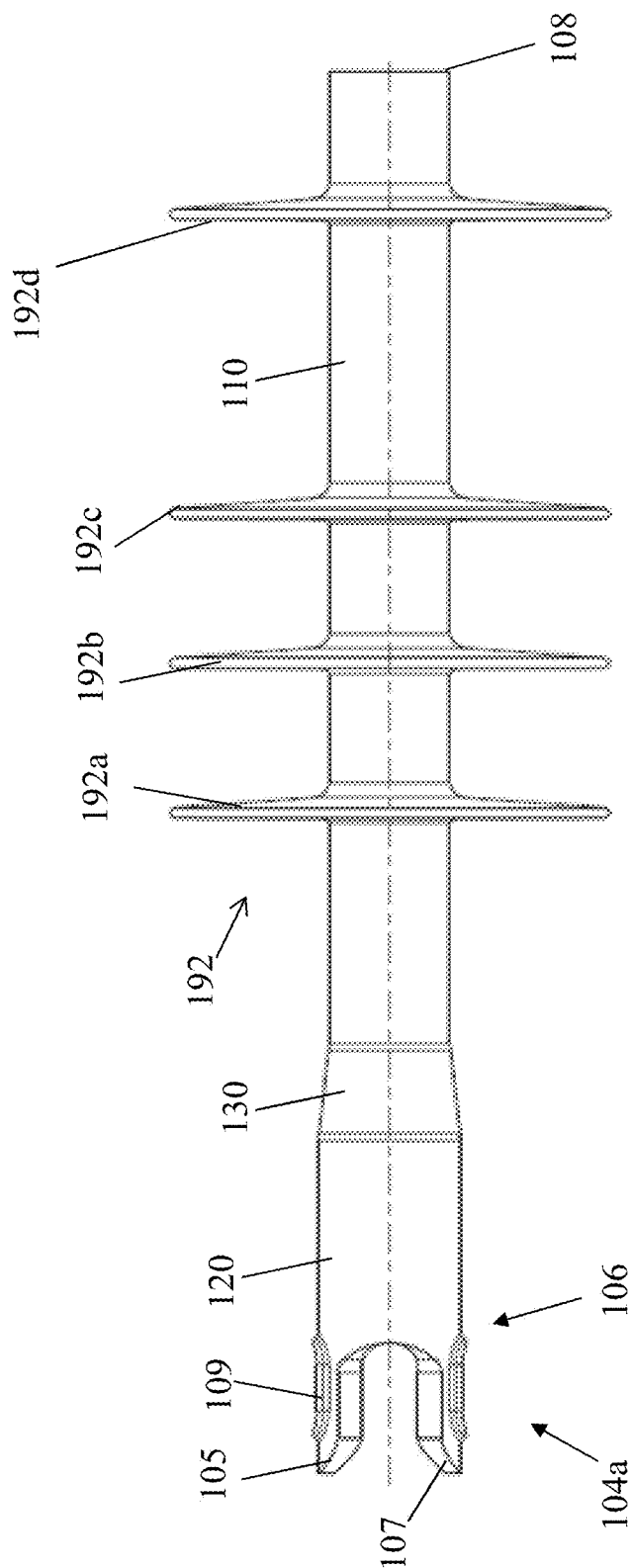
FIGS. 4A and 4B (collectively 'FIG. 4') illustrate a side view and a cross sectional view of an example variable diameter housing having optional pull tabs with finger-grip through-holes in its relaxed state, in accordance with example embodiments of the present disclosure.
Figure 4B:
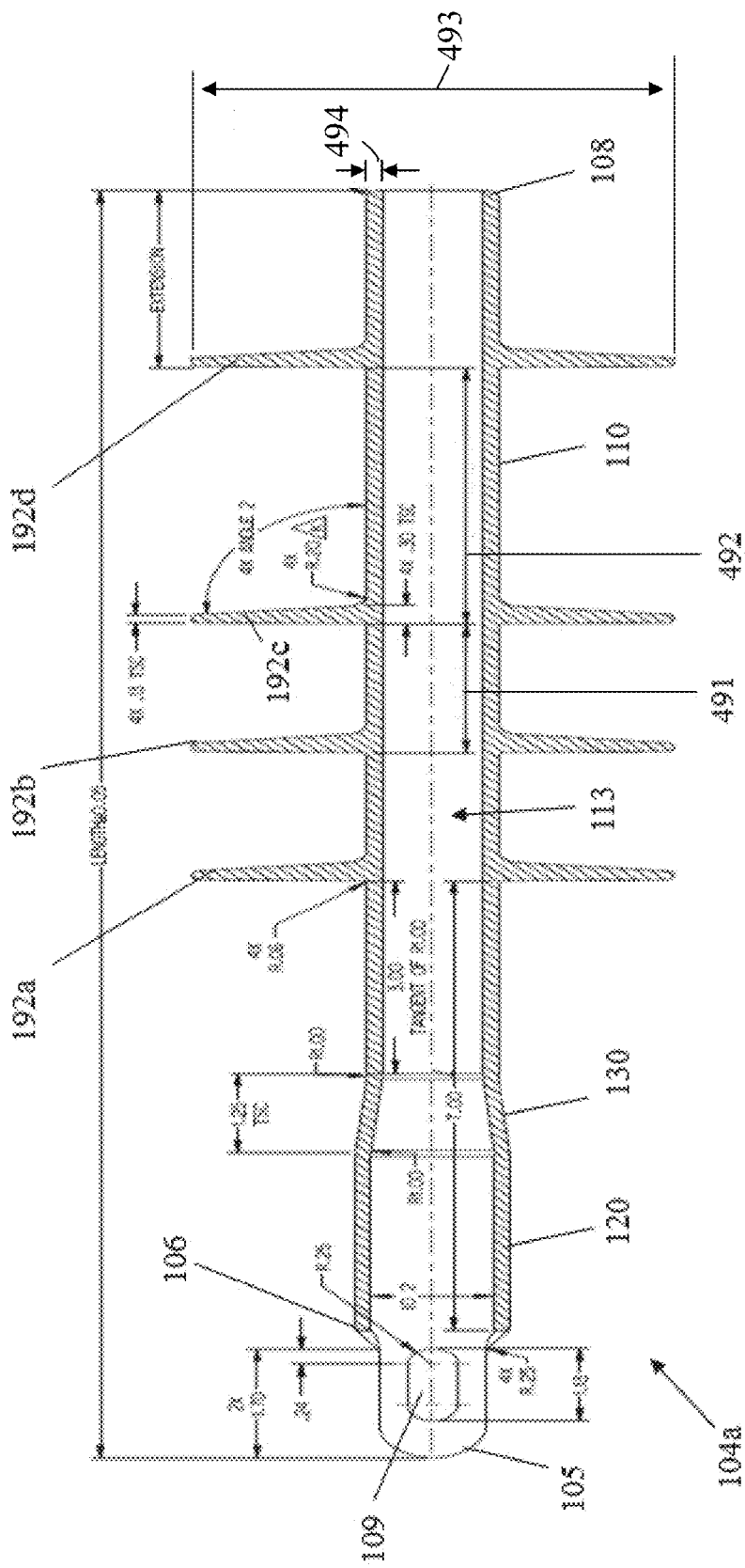
Figure 5:
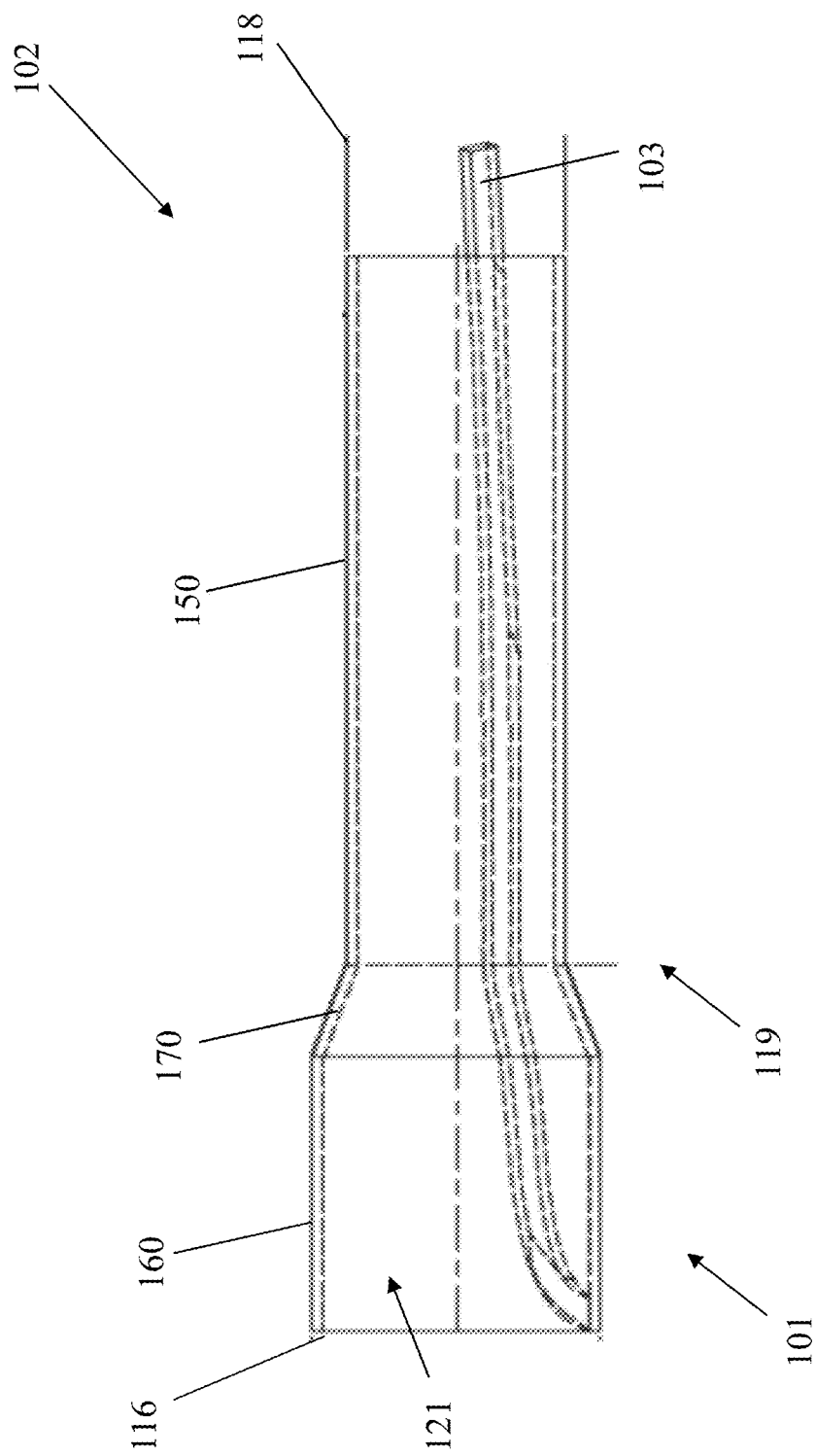
FIG. 5 illustrates a cross-sectional view of a variable diameter core, in accordance with example embodiments of the present disclosure.
Figures 6A, 6B:
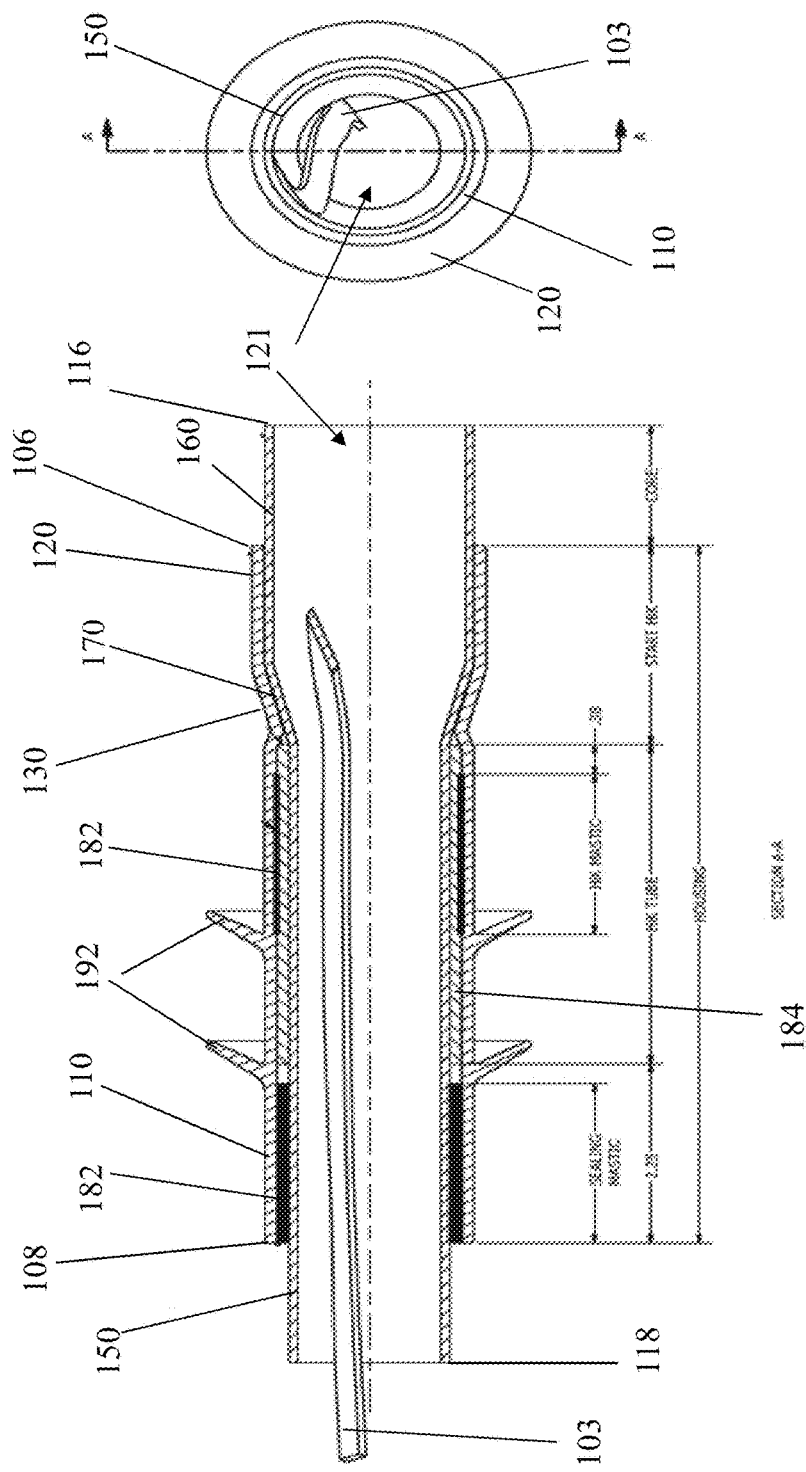
FIG. 6A illustrates an end view of the example variable diameter core and housing assembly of FIG. 3A, in accordance with example embodiments of the present disclosure.
FIG. 6B illustrates a cross-sectional view of the example variable diameter core of FIG. 3A supporting the variable diameter housing in a radially expanded state, in accordance with example embodiments of the present disclosure.

FIGS. 3A, 3B, and 3C (collectively 'FIG. 3') illustrate perspective views of different example variable diameter core terminations having a variable diameter housing, in accordance with example embodiments of the present disclosure; FIGS. 4A and 4B (collectively 'FIG. 4') illustrate a side view and a cross sectional view of an example variable diameter housing in its relaxed state and having optional pull tabs with finger-grip through-holes in accordance with example embodiments of the present disclosure; FIG. 5 illustrates a cross-sectional view of a variable diameter core, in accordance with example embodiments of the present disclosure; FIG. 6A illustrates an end view of the example variable diameter core and housing assembly of FIG. 3A, in accordance with example embodiments of the present disclosure; and FIG. 6B illustrates a cross-sectional view of the example variable diameter core of FIG. 3A supporting the variable diameter housing in a radially expanded state, in accordance with example embodiments of the present disclosure. FIGS. 6A and 6B are collectively referred to as FIG. 6.

Now referring to FIGS. 3-6, the variable diameter terminations 100a, 100b, and/or 100c (herein "variable diameter termination 100") may include a variable diameter core 102 that supports a variable diameter housing 104 in a radially expanded state along the length of the variable diameter core 102. In particular, the variable diameter core 102 may be a flat strip or a ribbon that may be helically wound to form a tubular member 101 having a diameter that is larger than the diameter of the variable diameter housing 104 in its relaxed state. The larger diameter of the variable diameter core 102 allows the variable diameter core 102 to maintain the variable diameter housing 104 in the radially expanded state when the variable diameter housing 104 is disposed over the variable diameter core 102.

In certain example embodiments, in the radially expanded state, the variable diameter housing 104 may be applied to a cable (not shown) by placing the variable diameter termination 100 about the cable with the cable passing through the variable diameter core 102, and removing the variable diameter core 102 to allow the variable diameter housing 104 to collapse about a portion of the cable. In one example embodiment, the variable diameter core 102 may be removed by unwinding the helically wound flat strip or ribbon by pulling an end 103 of the flat strip. However, in other example embodiments, the variable diameter core 102 may be removed by any other appropriate means once the prepared cable is inserted through the variable diameter core 102.

As illustrated in FIGS. 5 and 6, the tubular member 101 of the variable diameter core 102 may have a proximal end 116, a distal end 118, and a body 119 that extends from the proximal end 116 to the distal end 118 and defines a hollow cavity 121 through which the cable is passed. In particular, the body 119 of the variable diameter core 102 may have a varying outer diameter such that the variable diameter core 102 defines three different diameter zones: a first diameter zone 150, a second diameter zone 160, and a transition diameter zone 170 disposed between the first diameter zone 150 and the second diameter zone 160. The outer diameter of the first diameter zone 150 may be smaller than the outer diameter of the second diameter zone 160. Further, the outer diameter of the transition diameter zone 170 may steadily increase from the first diameter zone 150 to the second diameter zone 160 such that the transition diameter zone 170 defines a smooth slope surface extending from the first diameter zone 150 to the second diameter zone 160. In other words, the increase in diameter from the first diameter zone 150 to the second diameter zone 160 is not abrupt or sudden.

In certain example embodiments, the variable diameter core 102 may be formed in many ways, such as by ultrasonically welding the adjacent edges of the helically wound flat strip or ribbon to form a perforation along the helical seam, using an interlocking fit, or any other appropriate mechanism. Further, the variable diameter core 102 is preferably formed of a durable, flexible polymer such as cellulose acetate, butyrate, polypropylene, polyethylene, polyvinylchloride (PVC), polyphenylene oxide (PPO), acrylonitrile butadiene styrene (ABS), polycarbonate, etc. Alternatively, the variable diameter core 102 may be formed using any other appropriate material without departing from a broader scope of the present disclosure.

As described above, in addition to the variable diameter core 102, the variable diameter termination 100 may include the variable diameter housing 104. In particular, as illustrated in FIGS. 4A and 4B, the variable diameter housing 104 may have a proximal end 106, a distal end 108, and a tubular body disposed in between and extending from the proximal end 106 to the distal end 108. Further, the tubular body of the variable diameter housing 104 defines a hollow cavity 113 that is configured to receive the variable diameter core 102. Furthermore, in certain example embodiments, as illustrated in FIGS. 4A and 4B, the variable diameter housing 104a may include a pair of pull tabs 105 and 107 extending out from the proximal end 106 of the variable diameter housing 104 in a direction opposite to the distal end 108 of the variable diameter housing 104. Each pull tab 105 and 107 may include an aperture 109 (also referred to as a 'finger-grip through hole') that is configured to and shaped to receive one or more fingers of a user to provide additional grip to fold the pull tabs (105, 107) outward and back towards the distal end 108 of the variable diameter housing 104 for certain applications. However, in other example embodiments, as illustrated in FIGS. 3 and 6, the variable diameter housing 104 may not include the pull tabs (105, 107). In yet another example embodiment, the variable diameter housing 104 may include fewer or more pull tabs than illustrated in FIG. 4 without departing from a broader scope of the present disclosure.

Furthermore, similar to the variable diameter core 102, the tubular body of the variable diameter housing 104 may have a varying diameter both in its relaxed state and when it is disposed over the variable diameter core 102. The varying diameter extends from the proximal end 106 to the distal end 108. That is, the inner diameter of the variable diameter housing 104 may define three diameter zones, i.e., a first diameter zone 110 adjacent the distal end 108, a second diameter zone 120 adjacent the proximal end 106, and a transition diameter zone 130 disposed between the first diameter zone 110 and the second diameter zone 120. The inner diameter of the first diameter zone 110 may be smaller than the inner diameter of the second diameter zone 120. Further, the inner diameter of the transition diameter zone 130 may steadily increase from the first diameter zone 110 to the second diameter zone 120 such that the transition diameter zone 130 defines a smooth sloped surface extending from the first diameter zone 110 to the second diameter zone 120. In other words, the increase in diameter from the first diameter zone 110 to the second diameter zone 120 is not abrupt or sudden.

As illustrated in FIGS. 3, 4, and 6, the variable diameter housing 104 may further include one or more sheds 192, extending outwardly (and substantially perpendicular to the tubular body of the housing 104) from the first diameter zone 110 of variable diameter housing 104 to provide additional insulation. The number of sheds 192 may vary from one termination to another based on the type of cable that is to be terminated. For example, as illustrated in FIGS. 3A, 3B, and 3C, the variable diameter housing 104 of a variable diameter termination 100a for terminating a 15 kV cable may have fewer sheds than the variable diameter housing 104 of a variable diameter termination 100b and/or 100c for terminating 25 kV and/or 35 kV cables.

In one example, as illustrated in FIGS. 4A and 4B, the variable diameter housing 104 may include four sheds 192a-d, where three sheds 192a-c are formed as one set while the fourth shed 192d is formed as a second set that is offset from the third shed 192c of the first set of sheds. The offset distance 492 between the third shed 192c and the fourth shed 192d is larger than the inter-shed distance 491 between each of the first, second, and third sheds 192a-c of the first set of sheds 192. The inter-shed distance 491 between adjacent sheds of one set of sheds 192 (from the bottom of one shed to the bottom of an adjacent shed) may range from 1.5 inches to 2.5 inches. In one example, the inter-shed distance may be preferably 2 inches. The offset distance 492 between adjacent sheds of two adjacent sets of sheds 192 (e.g., between the third shed 192c and the fourth shed 192d) may range from 2.5 inches to 4.5 inches, and preferably from 3 inches to 4 inches. Furthermore, the diameter 493 of each shed may range from 3 inches to 5 inches, and preferably from 3.8 inches to 4.7 inches. Additionally, the ratio of the diameter 493 of the sheds 192 to the inter-shed distance 492 may range from 1.2 to 3.3, and preferably from 1.52 to 3.13. In one example, the ratio of the diameter 493 of the sheds 192 to the inter-shed distance 492 may range from 1.9 to 2.35.

The inter-shed distance 491 between the sheds of one set of sheds 192 and the diameter 493 of each shed 192 may be larger than in conventional terminations. The larger inter-shed distance 491 between the sheds of one set of sheds 192 and the larger diameter 493 of each shed 192 increases a creep distance and strike distance (dry-arc distance) of the variable diameter housing 104 using a fewer number of sheds 192, which in turn improves the tracking resistance and impulse withstand capability of the variable diameter housing 104. The improved tracking resistance and impulse withstand capability improves and increases a longevity of the variable diameter housing 104.

The larger separation (offset distance 492) between adjacent sheds of two adjacent sets of sheds enables different variable diameter termination models (e.g., a longer termination with four or more sheds and a shorter termination with three sheds) to be manufactured using the same tooling. In particular, the larger offset distance 492 between the adjacent sheds of adjacent sets of sheds allows a block to be placed in or removed from the tooling to manufacture a shorter variable diameter termination model having only one set of sheds or a longer variable diameter termination model having more than one set of sheds using the same tooling.

In particular, as illustrated in FIGS. 3-6, the outer diameter of the variable diameter core's first diameter zone 150 is greater than the inner diameter of the variable diameter housing's first diameter zone 110 when the variable diameter housing 104 is in a relaxed state (i.e., when variable diameter housing 104 is not disposed on the variable diameter core 102). Similarly, in the relaxed state of the variable diameter housing 104, the outer diameter of the variable diameter core's second diameter zone 160 and transition diameter zone 170 are greater than the inner diameter of the variable diameter housing's second diameter zone 120 and transition diameter zone 130, respectively.

The variable diameter housing 104 may be an elastomeric housing that can be stretched to fit over various cable ranges when installed. In certain example embodiments, the variable diameter housing 104 may be formed using an elastomer such as silicone rubber, natural rubber, styrene-butadiene rubber, polychloroprene, urethane rubber or ethylene propylene rubber (this list is not meant to be exhaustive). However, in other example embodiments, the variable diameter housing 104 can be formed using any other appropriate stretchable material based on the application without departing from a broader scope of the present disclosure.

As illustrated in FIG. 6, the variable diameter housing 104 may be disposed over the variable diameter core 102 such that: (a) the first diameter zone 110, the second diameter zone 120, and the transition diameter zone 130 of the variable diameter housing 104 may be disposed over the first diameter zone 150, the second diameter zone 160, and the transition diameter zone 170 of the variable diameter housing 102, respectively, and (b) the variable diameter housing 102 is fully expanded radially along its length. In particular, in the radially expanded state, the inner diameter of the first diameter zone 110, the second diameter zone 120, and the transition diameter zone 130 of the variable diameter housing 104 may substantially match the outer diameter of the first diameter zone 150, the second diameter zone 160, and the transition diameter zone 170 of the variable diameter core 102, respectively. Additionally, as illustrated in FIG. 6, one or more other materials may be disposed in between the variable diameter core 102 and the variable diameter housing 104, such as a high dielectric constant mastic seal 182 for reducing electric stress and to fill any air voids present along the cable, a high dielectric constant stress control tube 184 to grade the electrical stress, and so on.

In one example, the variable diameter housing 104 of the variable diameter termination 100 described herein may be expanded to a same extent throughout the entire length of the variable diameter housing 104 as compared to conventional terminations (e.g., variable diameter core with single diameter housing or single diameter core with variable diameter housing) where the various portions of the elastomeric housing are expanded to different extents. That is, in one example, each of the first diameter zone 110, second diameter zone 120, and transition diameter zone 130 of the variable diameter housing 104 in the variable diameter termination 100 described herein may be expanded 300% from their relaxed states (ideally the maximum expansion without significant deleterious effects to the physical properties for the given material), while in conventional terminations one portion of the elastomeric housing may be expanded 300% and the other portion may only be expanded 100%-200% which may negatively affect the cable range taking ability of the termination (such as in the prior art example of FIG. 1) or require a more difficult installation process (such as in the prior art example of FIG. 2). Further, the variable diameter design of the housing 104 as well as the core 102 in the variable diameter termination 100 described herein allows a simple, fast, and easy installation of the variable diameter termination on a prepared cable and also provides an ability to take/cover a larger range of cables compared to conventional terminations.

Example Method of Manufacture of the Variable Diameter Termination

Figure 7:
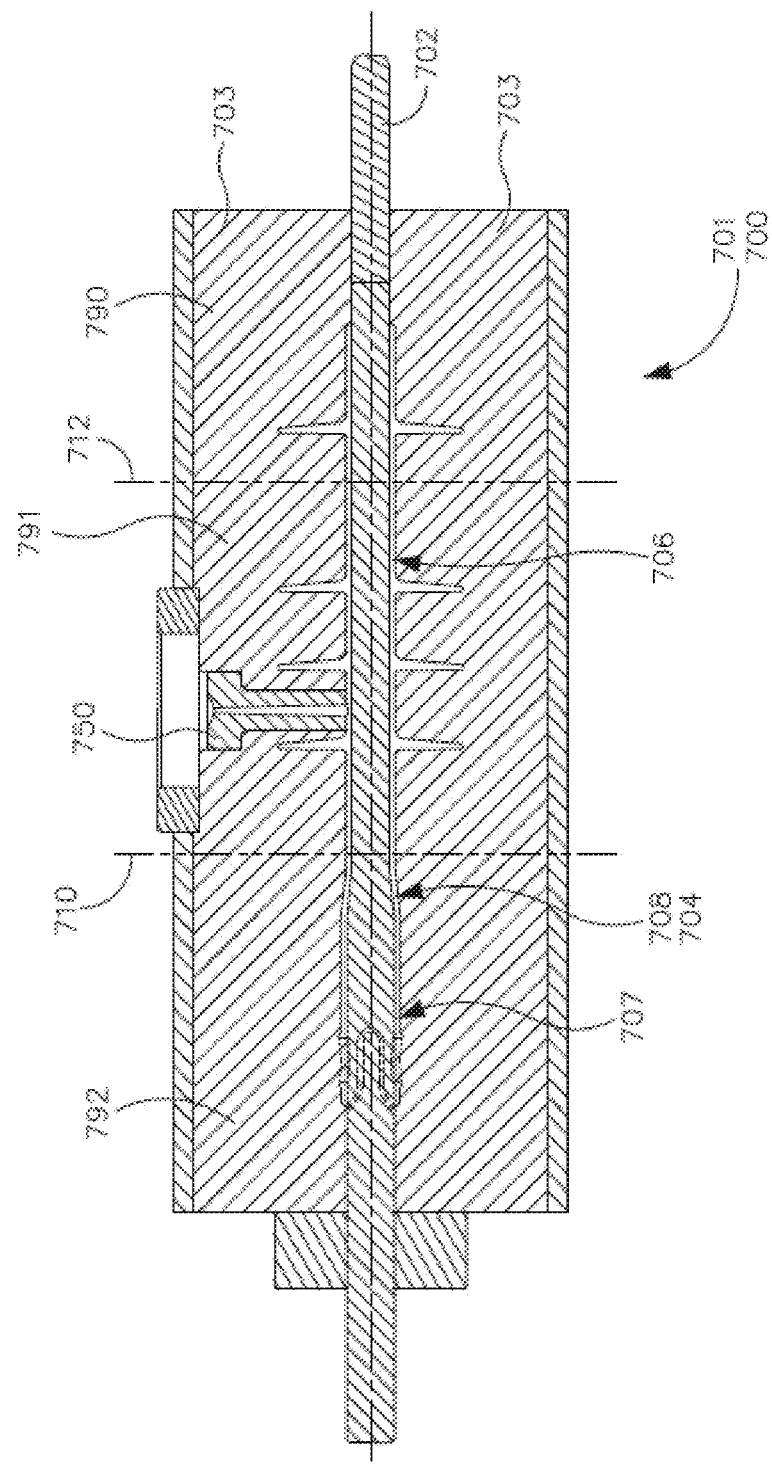
FIG. 7 illustrates a cross-section of an example tooling that is used to manufacture the different variable diameter housing models, in accordance with example embodiments of the present disclosure.
Figure 8:
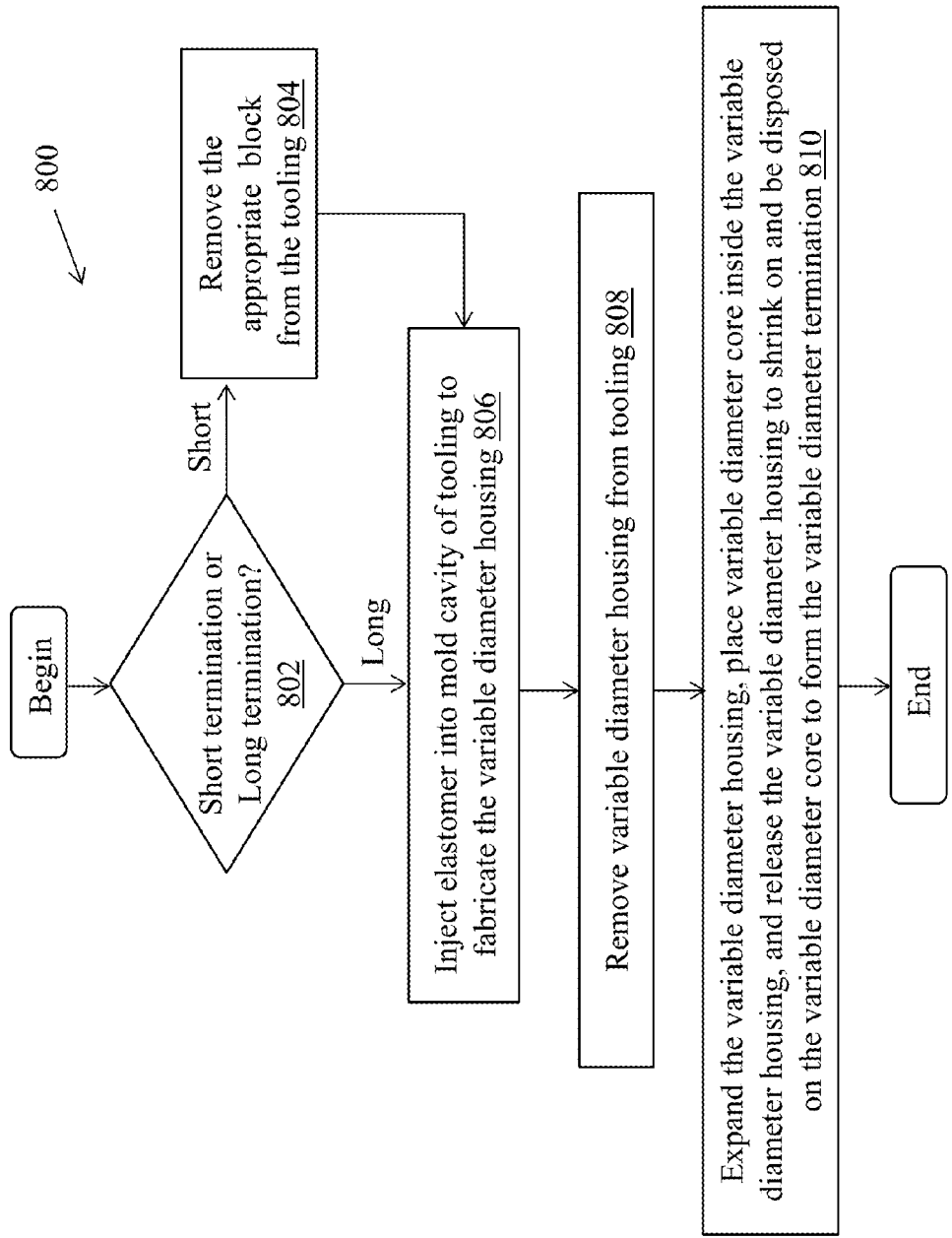
FIG. 8 is a flowchart that illustrates a method of manufacturing the different variable diameter termination models.

FIG. 7 illustrates an example tooling that is used to manufacture the different variable diameter termination models, in accordance with example embodiments of the present disclosure; and FIG. 8 is a flowchart that illustrates a method of manufacturing the different variable diameter termination models.

Referring to FIGS. 7-8, the example tooling 700 may include a variable diameter housing mold 701 that has a central member 702 that is surrounded by a cover member 703 such that a cavity 704 that is shaped substantially similar to the variable diameter housing 104 having four sheds 192*a-d* is formed in between the central member 702 and the cover member 703. In particular, the cavity 704 may have a variable diameter from one end to the opposite end. For example, the cavity 704 may have a first smaller diameter zone 706, a second larger diameter zone 707, and a transition diameter zone 708 formed between and expanding in diameter from the first smaller diameter zone 706 to the second larger diameter zone 707. The cavity for the sheds 192 may be formed in the first smaller diameter zone 706. The outer diameter of the central member 702 may be substantially similar to the inner diameter of the variable diameter housing 104 in its relaxed state. Further, the thickness of the cavity 704 may be substantially similar to the thickness 494 of the variable diameter housing 104.

The central member 702 may include, but is not limited to, a steel mandrel. Further, the cover member 703 may be formed as two or more segments (e.g., top segment and bottom segment) that may be movable such that it can be pushed towards the hollow central member 702 to form the cavity 704 with the hollow central member 702. Similarly, the two or more segments of the cover member 703 may also be pulled away from the hollow central member 702 to remove the variable diameter housing 104 from the variable diameter housing mold 701 once it is formed. Further, the tooling 700 may be configured to receive one or more blocks therein to manufacture different variable diameter housing models using the same tooling 700. For example, as illustrated in FIG. 7, the tooling 700 may include three blocks or pairs of blocks that are disposed between the cover member 703 and the central member 702. Alternatively, the cover member 703 may define the three blocks. In FIG. 7, the three blocks include a top block 790, a central block 791, and a bottom block 792, where the blocks are divided by the illustrative (imaginary) lines 710 and 712. The top block 790 defines the cavity for a portion of the first smaller diameter zone 706 with the fourth shed 192*d* and the extended length of the variable diameter housing 104, the central block 791 defines the cavity for a remainder portion of the first smaller diameter zone 706 with the first set of sheds 192*a-c*, and the bottom block 792 defines the cavity for the second larger diameter zone 707 and a transition diameter zone 708.

In particular, the top block 790 may be placed in the tooling to manufacture a longer variable diameter housing 104 having four or more sheds 192 as illustrated in FIG. 3C (or FIG. 4), and the top block 790 may be removed from the tooling and replaced with a block without a cavity for the fourth shed to manufacture a shorter variable diameter housing 104 having three sheds 192 as illustrated in FIG. 3B. The offset distance 492 between the two sets of sheds (e.g., between the third shed 192*c* and the fourth shed 192*d*), allows for the manufacture of two different variable diameter housing models, i.e., a shorter variable diameter housing (e.g., three sheds) and a longer variable diameter housing (e.g., four or more sheds), while still providing sufficient distance of a couple of inches between the distal end 108 of the variable diameter housing and the closest shed to the distal end 108 in both the models. The distance of a couple of inches between the distal end 108 and the closest shed (192d or 192c) of the variable diameter housing 104 in both the shorter and longer models allows for applying a seal on the variable diameter housing 104 during installation on a cable.

The movement of the two or more segments of the cover member 703 may be controlled hydraulically or by any other appropriate control mechanism without departing from a broader scope of the present disclosure. In one example embodiment, the tooling 700 may be an injection molding system having an injection port 750. However, in other example embodiments, the tooling 700 may include any other appropriate molding system or die cast system without departing from a broader scope of the present disclosure.

As illustrated in FIG. 8, the process of manufacturing the variable diameter termination 100 begins in operation 802 where a determination may be made whether a shorter variable diameter housing 104 (having three or fewer sheds) or a longer variable diameter housing 104 (having four or more sheds) is to be fabricated. In one example, the determination may be made automatically by the tooling 700. In another example, the determination may be made manually and corresponding instructions may be fed to the tooling 700. In operation 802, if it is determined that the shorter variable diameter housing 104 is to be fabricated, then the process proceeds to operation 804 where the top block 790 is removed from the tooling 700 and replaced with a block without a cavity for a fourth shed as described above to form the shorter variable diameter housing 104. Then, in operation 806, the elastomer may be injected into the cavity 704 through the injection port 750 to form the shorter variable diameter housing 104. Alternatively, in operation 802, if it is determined that the longer variable diameter housing 104 is to be fabricated, then the process proceeds to operation 806 by omitting the step of removing the top block 790 in the tooling 700 recited in operation 804.

Responsive to fabricating the variable diameter housing 104 (short or long), in operation 808, the variable diameter housing 104 is removed from the tooling 700. Further, in operation 810, the variable diameter housing 104 is expanded from its relaxed state and a variable diameter core 102 is inserted through the cavity 113 of the variable diameter housing 104. Then, the variable diameter housing 104 is released such that it shrinks on and is disposed over the variable diameter core 102 in a stretched state. In particular, the variable diameter housing 104 may be disposed over the variable diameter core 102 such that: (a) the first diameter zone 110, the second diameter zone 120, and the transition diameter zone 130 of the variable diameter housing 104 may be disposed over the first diameter zone 150, the second diameter zone 160, and the transition diameter zone 170 of the variable diameter housing 102, respectively, and (b) the variable diameter housing 102 is fully expanded radially to a same extent along its entire length.

Although the present disclosure is described with reference to example embodiments, it should be appreciated by those skilled in the art that various modifications are well within the scope of the present disclosure. From the foregoing, it will be appreciated that an embodiment of the present disclosure overcomes the limitations of the prior art. Those skilled in the art will appreciate that the present disclosure is not limited to any specifically discussed application and that the embodiments described herein are illustrative and not restrictive. From the description of the example embodiments, equivalents of the elements shown therein will suggest themselves to those skilled in the art, and ways of constructing other embodiments of the present disclosure will suggest themselves to practitioners of the art. Therefore, the scope of the present disclosure is not limited herein.

What is claimed is:

1. A device for terminating a cable, the device comprising:
an elastomeric tubular housing, in a relaxed state when the elastomeric tubular housing is not disposed on a tubular core and the cable, comprising a first portion having a first inner diameter, a second portion having a second inner diameter, and a third portion disposed between the first portion and the second portion and having a transition inner diameter that increases from the first inner diameter to the second inner diameter;
the tubular core configured to support the elastomeric tubular housing in a radially expanded state and comprising a first portion having a third outer diameter, a second portion having a fourth outer diameter, and a third portion disposed between the first portion and the second portion and having a transition outer diameter that increases from the third outer diameter to the fourth outer diameter,
wherein the first portion of the elastomeric tubular housing is disposed over the first portion of the tubular core, the second portion of the elastomeric tubular housing is disposed over the second portion of the tubular core, and the third portion of the elastomeric tubular housing is disposed over the third portion of the tubular core such that each of the first portion, the second portion, and the third portion of the elastomeric tubular housing is radially expanded to a substantially same extent.

2. The device of claim 1, wherein the elastomeric tubular housing comprises one or more pull tabs that extend out from a proximal end of the elastomeric tubular housing in a direction opposite to a distal end of the elastomeric tubular housing.

3. The device of claim 2, wherein the one or more pull tabs include an aperture configured for gripping the pull tab.

4. The device of claim 1, wherein the tubular core comprises a helically wound ribbon which is removable by pulling on an end of the helically wound ribbon such that the elastomeric tubular housing collapses about a portion of the cable when the helically wound ribbon is removed.

5. The device of claim 1, wherein the second inner diameter of the elastomeric tubular housing is larger than the first inner diameter of the elastomeric tubular housing, and wherein the fourth outer diameter of the tubular core is larger than the third outer diameter of the tubular core.

6. The device of claim 1, wherein, in a relaxed state before the elastomeric tubular housing is disposed over the tubular core, the third outer diameter of the tubular core is larger than the first inner diameter of the elastomeric tubular housing, and wherein the fourth outer diameter of the tubular core is larger than the second inner diameter of the elastomeric tubular housing.

7. The device of claim 1, wherein in the radially expanded state, the first inner diameter of the first portion of the elastomeric tubular housing substantially matches the third outer diameter of the first portion of the tubular core, the second inner diameter of the second portion of the elastomeric tubular housing substantially matches the fourth outer diameter of the second portion of the tubular core, and the transition inner diameter of the third portion of the elastomeric tubular housing substantially matches the transition outer diameter of the third portion of the tubular core.

8. The device of claim 1, further comprising a plurality of sheds formed on the first portion of the elastomeric tubular housing to provide additional insulation.

9. The device of claim 8, wherein each shed of the plurality of sheds extend radially outward and substantially perpendicular to the first portion of the elastomeric tubular housing.

10. The device of claim 8, wherein the plurality of sheds are formed as multiple sets of sheds, and wherein a distance between adjacent sheds of adjacent sets of sheds is larger than the distance between adjacent sheds within one set of sheds of the multiple sets of sheds.

11. The device of claim 10, wherein the distance between the adjacent sheds within one set of sheds ranges from 1.5 inches to 2.5 inches.

12. The device of claim 10, wherein the distance between adjacent sheds of adjacent sets of sheds ranges from 2.5 inches to 4.5 inches.

13. The device of claim 10, wherein the diameter of each shed of the plurality of sheds ranges from 3 inches to 5 inches.

\* \* \* \* \*